United States Patent
Tabata et al.

(10) Patent No.: US 7,301,681 B2
(45) Date of Patent: Nov. 27, 2007

(54) SYSTEM AND METHOD FOR PROCESSING DOCUMENTS WITH FOUR-LINE CCD SENSOR

(75) Inventors: Sunao Tabata, Mishima (JP); Hiroki Kanno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1061 days.

(21) Appl. No.: 10/382,099

(22) Filed: Mar. 6, 2003

(65) Prior Publication Data

US 2004/0174555 A1    Sep. 9, 2004

(51) Int. Cl.
*H04N 1/46* (2006.01)
*H04N 1/04* (2006.01)

(52) U.S. Cl. .............. 358/514; 358/505; 358/515; 358/523; 358/483; 358/474; 358/444

(58) Field of Classification Search ........ 358/512–514, 358/505, 506, 515, 518, 501, 483, 482, 487, 358/523, 497, 494, 474, 444, 403; 250/208.1, 250/234–236; 382/167, 162
See application file for complete search history.

(56) References Cited

U.S. PATENT DOCUMENTS

| | | | |
|---|---|---|---|
| 5,440,409 A | 8/1995 | Sugano et al. | |
| 5,724,152 A * | 3/1998 | Hayashi et al. | 358/296 |
| 5,731,880 A | 3/1998 | Takaragi et al. | |
| 5,773,814 A * | 6/1998 | Phillips et al. | 250/208.1 |
| 5,832,112 A | 11/1998 | Funada et al. | |
| 6,400,470 B1 * | 6/2002 | Takaragi et al. | 358/448 |
| 6,765,703 B1 * | 7/2004 | Watanabe | 358/514 |
| 6,958,835 B2 * | 10/2005 | Sakakibara et al. | 358/514 |
| 7,046,402 B2 * | 5/2006 | Watanabe | 358/514 |
| 2002/0039191 A1 | 4/2002 | Kinoshita | |

FOREIGN PATENT DOCUMENTS

JP    6-251128 A    9/1994

OTHER PUBLICATIONS

U.S. Appl. No. 09/670,621, filed Sep. 27, 2000, Watanabe.

* cited by examiner

*Primary Examiner*—Cheukfan Lee
(74) *Attorney, Agent, or Firm*—Foley & Lardner LLP

(57) ABSTRACT

An image forming apparatus includes a four line CCD which produces RGB data and K data that are read out selectably, and a selector which selects whether to output the RGB data that is provided from the four line CCD. The image forming apparatus also includes a storage part which stores a plurality of patterns, and a judgment part that produces a judgment signal based on a comparison of the RGB data and the plurality of patterns stored in the storage part.

1 Claim, 4 Drawing Sheets

SYSTEM AND METHOD FOR PROCESSING DOCUMENTS WITH FOUR-LINE CCD SENSOR

FIELD OF THE INVENTION

The present invention relates generally to image processing and, more particularly, to a system and method for processing documents with a four-line charge-couple device (CCD) sensor in an image processing system.

BACKGROUND OF THE INVENTION

To prevent improper copying of documents, it is known for an image processing system to detect a specific original and prohibit copying based on that detection. An example of such an image processing system is disclosed in U.S. Pat. No. 5,832,112 to Funada et al. The Funada et al. system judges whether input color image information is a predetermined image, and prohibits copying depending on the judgment. This judgment is always performed on a document being copied, which can waste system resources where certain documents or copy processes are not capable of producing counterfeits.

The Funada et al. system, like other conventional color image processing systems, includes a 3-line CCD sensor for detecting colors in an original image. The 3-line sensor generates color information for red, green and blue (RGB) data. Typically, the RGB data is converted or translated into cyan, magenta and yellow (CMY) data. Neither the RGB data nor the CMY data identifies any black data in the original image. To identify the black data, another translation is performed on the CMY data to obtain CMY and black (K) data. Systems like that of Funada et al. have been designed and configured to process images based on the generated RGB data. They have not, however, been designed or configured to process images based on a 4-line CCD sensor generating both RGB data and K data.

One parameter involved in image processing is increasing or decreasing a zoom level of the document being copied. To increase or decrease the zoom level in the reproduced document, adjustment is made both in the main scanning direction, i.e., the direction in which the carriage scanner travels, and the sub-scanning direction, i.e., the direction perpendicular to the main scanning direction. The carriage scanner is the element that moves a lamp to illuminate the document being copied. In conventional systems, the adjustment in the main scanning direction is done by adjusting the speed of the scanner carriage, and the adjustment in the sub-scanning direction is effected through image processing algorithms.

In some image processing systems, the zoom level can vary significantly from the regular zoom level of 100%. The range can be from, for example, a low zoom level of 50%, to a high zoom level of 200%. With steps of 1% between each zoom level, the scanner carriage must be capable of a significant number of speed adjustments. This significant number of speed adjustments greatly raises the cost for motor control of the scanner carriage, and makes them complicated. It would therefore be desirable to have a zoom level adjustment system that reduces the cost and complexity of the motor control of the scanner carriage.

SUMMARY OF THE INVENTION

According to an aspect of the invention, an image forming apparatus includes a four line CCD which produces RGB data and K data that are read out selectably, and a selector which selects whether to output the RGB data that is provided from the four line CCD. The image forming apparatus also includes a storage part which stores a plurality of patterns, and a judgment part that produces a judgment signal based on a comparison of the RGB data and the plurality of patterns stored in the storage part.

DETAILED DESCRIPTION OF THE PREFERRED EMBODIMENT

Figure 1A:
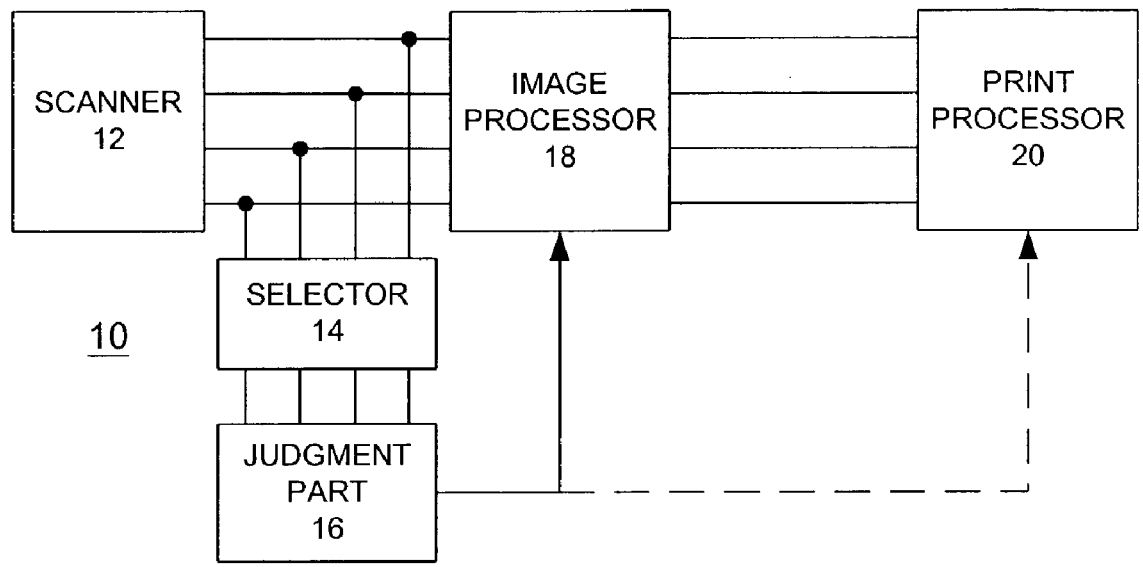
FIGS. 1A and 1B are block diagrams of alternative image processing systems according to an embodiment of the present invention.
Figure 1B:
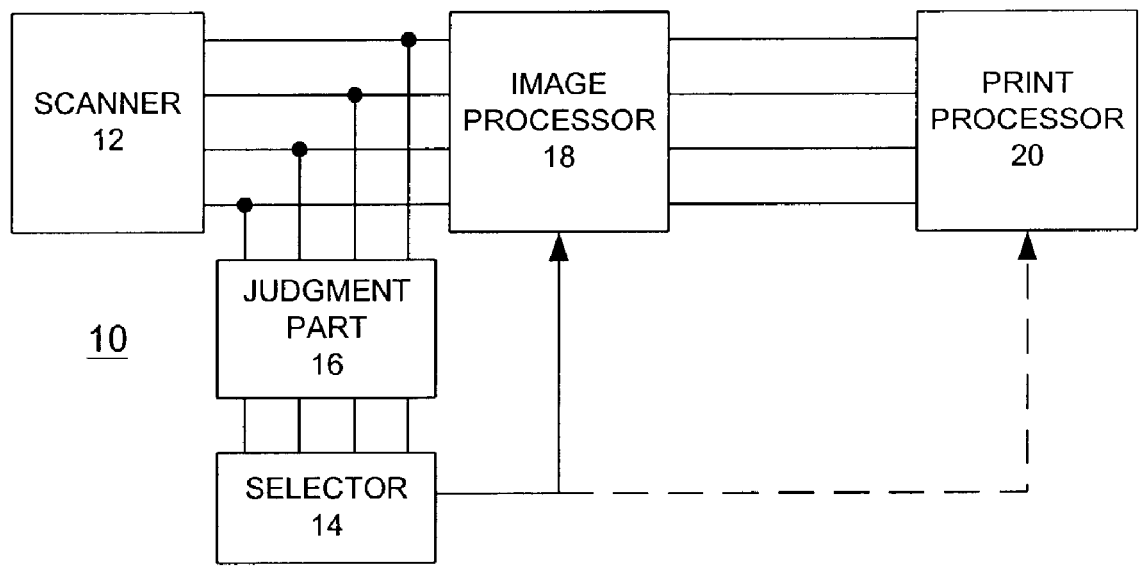

FIGS. 1A and 1B are block diagrams of alternative image processing systems according to an embodiment of the present invention. As shown in FIGS. 1A and 1B, a processing system 10 includes a scanner 12, a selector 14, a judgment part 16, an image processor 18 and a print processor 20. The processing system 10 in FIG. 1A is the same as the processing system 10 in FIG. 1B except for the relative arrangement of the selector 14 and the judgment part 16.

The scanner 12 scans an original image or document placed in or on the processing system 10, such as on a document table or in an automatic document feeder. The scanner 12 scans the original image with a CCD sensor. The CCD sensor is preferably a 4-line CCD sensor, where the four lines correspond to red, green, blue and black (RGBK). A more detailed description of an exemplary 4-line CCD sensor can be found, for example, in U.S. application Ser. No. 09/670,621 to Kouichi Watanabe entitled, "Method and Apparatus for Sensing Image," which is incorporated herein in its entirety by reference.

Input image data, which corresponds to the scanned original image output from the 4-line CCD sensor, includes RGB data and K data. This data is received by the image processor 18. The image processor 18 can perform a number of image processing processes on the RGB data and K data including, for example, log conversion, color conversion halftone processing, dithering, error diffusion, gamma correction or any other image processing step. The input image data processed by the image processor 18 is provided to the print processor 20. The print processor 20 prepares the processed input image data for reproduction of the original image on a sheet. The selector 14 and judgment part 16 are described in greater detail below.

Before the original image is reproduced on a sheet, it is possible to conduct a judgment process to determine whether or not the original image should be reproduced. Halting reproduction of an original image may be warranted, for example, to avoid counterfeiting or any type of unauthorized reproduction of an original image, such as a copyrighted image. The judgment process may be unnecessary, however, in certain circumstances, such as for certain types of original documents or based on the copying mode being used. Such a selective judgment process can be implemented using the selector 14 and the judgment part 16 of FIGS. 1A and 1B.

Figure 2:
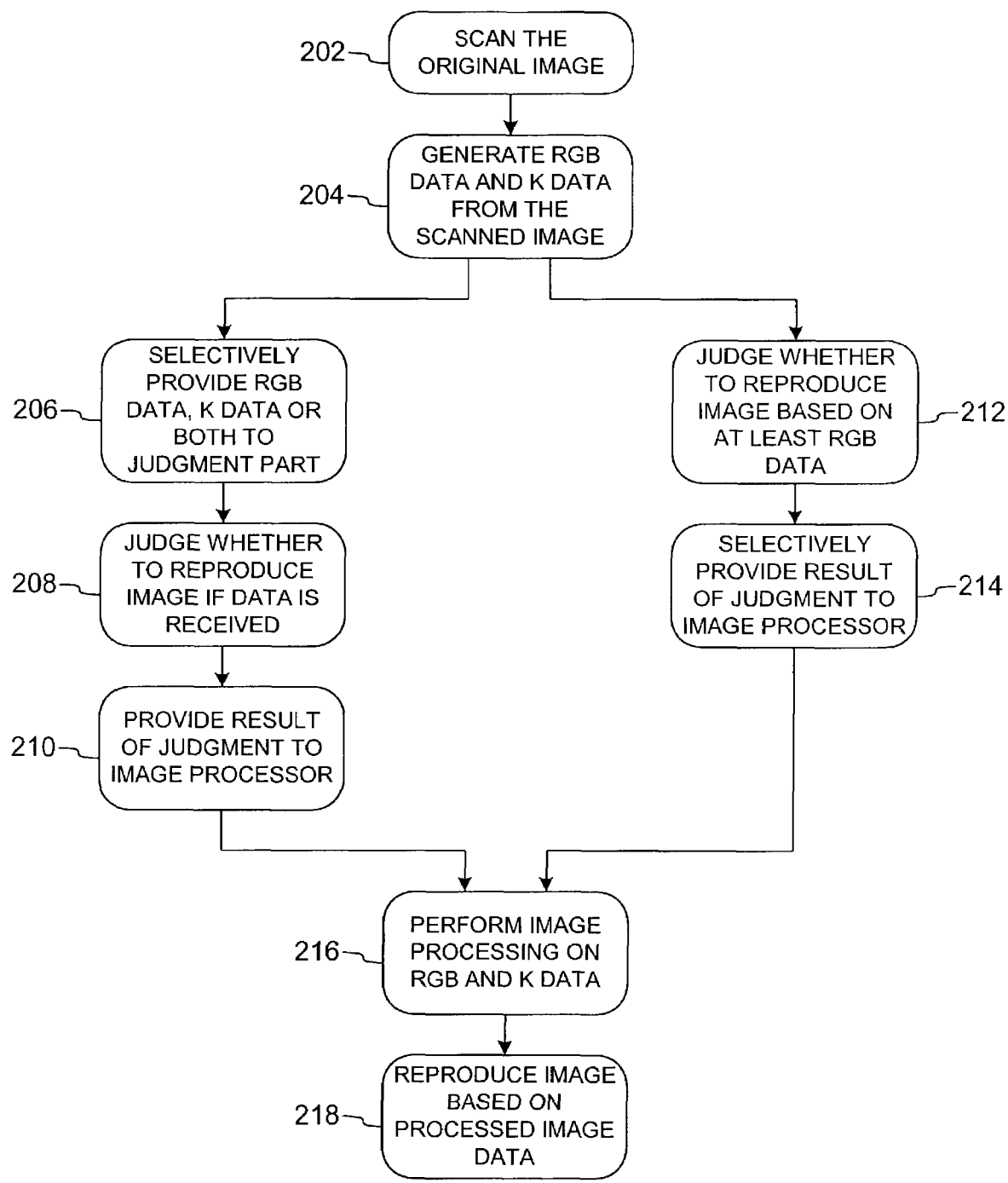
FIG. 2 is a flow diagram for processing an original image consistent with the present invention.

FIG. 2 is a flow diagram for processing an original image consistent with the present invention. As shown in FIG. 2, an original image is scanned by the scanner 12 (step 202). The scanner 12 includes a 4-line CCD sensor. The 4-line CCD sensor generates RGB data and K data from the scanned image (step 204).

After generating the RGB data and the K data, the nature of the subsequent processing of the data depends upon the configuration of the selector 14 and judgment part 16 of the processing system 10. If they are arranged according to the processing system 10 of FIG. 1A, then the selector 14 receives the RGB data and K data output from the scanner 12. The selector 14 selectively provides RGB data, K data or both to the judgment part 16 (step 206). The RGB data and K data may be stored in a storage medium of any known kind. The selective provision of data to the judgment part 16 depends on one or more factors. It may be unnecessary to provide any data to the judgment part 16 based on, for example, the copy mode or color information about the original.

For example, copying of an original image may be limited only if a color copy is being made. In such an arrangement, if the copy mode is a black and white mode, then it is unnecessary to perform the judgment of the judgment part 16, and therefore unnecessary for the selector 14 to provide image data to the judgment part 16. If the copy mode is a color mode, however, the selector 14 provides image data to the judgment part 16, either the RGB data or both the RGB and K data.

Alternatively, copying of an original image may be limited only if the original image is in color. Thus, if it is determined that the original image is not color based on the data values, then it is unnecessary to perform the judgment of the judgment part 16, and therefore unnecessary for the selector 14 to provide image data to the judgment part 16. If the original image is in color, then the selector 14 provides image data to the judgment part 16, either the RGB data or both the RGB and K data.

It is also possible to control the selector 14 as a combination of the copy mode and color information about the original. For example, the selector 14 may provide image data to the judgment part 14 only if it is determined that the original image is in color and the copy mode is a color mode.

In addition to these possibilities, the selector 14 can be configured to selectively provide image data in accordance with other factors. For example, the restriction on copying may be limited to black and white original images or to the black and white copy mode instead of color images and the color copy mode. In addition, other copy modes can be used such as text or photographic copy modes, or copy and scan. It is also possible to determine the copy mode automatically using an automatic color selector (ACS) system.

The selector 14 can also be configured to accommodate a situation where the RGB data and the K data have a different resolution. After receiving the RGB data and the K data, the selector can determine if they have a different resolution. For example, the resolution of the K data may be twice the resolution of the RGB data, meaning that there is twice as much K data than RGB data. If it is determined that there is a different resolution, the resolution of at least one of the RGB data and the K data can be adjusted to equalize the resolution. The selector 14 can include a resolution adjustment control part to perform the resolution adjustment. Alternatively, the selector 14 can be configured to provide only the RGB data or the K data to the judgment part 16 if the RGB data and the K data are determined to have a different resolution.

In addition, the resolution of the RGB data in a main scanning direction and a sub scanning can be different. A resolution conversion part can change the resolution of the RGB data in the main scanning direction and the sub scanning direction to have the same resolution, and the RGB data in the main scanning direction resolution and the sub scanning direction output from the resolution conversion part are inputted into the judgment part. Yet further, in this scenario (or simply separately in addressing different resolutions between the RGB data and the K data), the resolution conversion part can change the resolution of the K data in the main scanning direction and the sub scanning direction such that the resolution of the K data and the RGB data in the main scanning direction and the sub scanning direction are the same, and the RGB data and the K data in the main scanning direction resolution and the sub scanning direction output from the resolution conversion part are inputted into the judgment part If it is determined based on the applicable factors that the selector 14 is to provide image data to the judgment part 16, then the judgment part judges whether the scanned image should be reproduced or if the reproduction should be halted (step 208). To make this judgment, the judgment part 16 compares the image data received from the selector 14 to a library of protected patterns. The library of protected patterns can be stored in a storage area accessible to or part of the judgment part 16, such as a ROM, NVRAM or hard disk drive. The protected patterns may be selected and compiled by any known means in the art.

Figure 3:
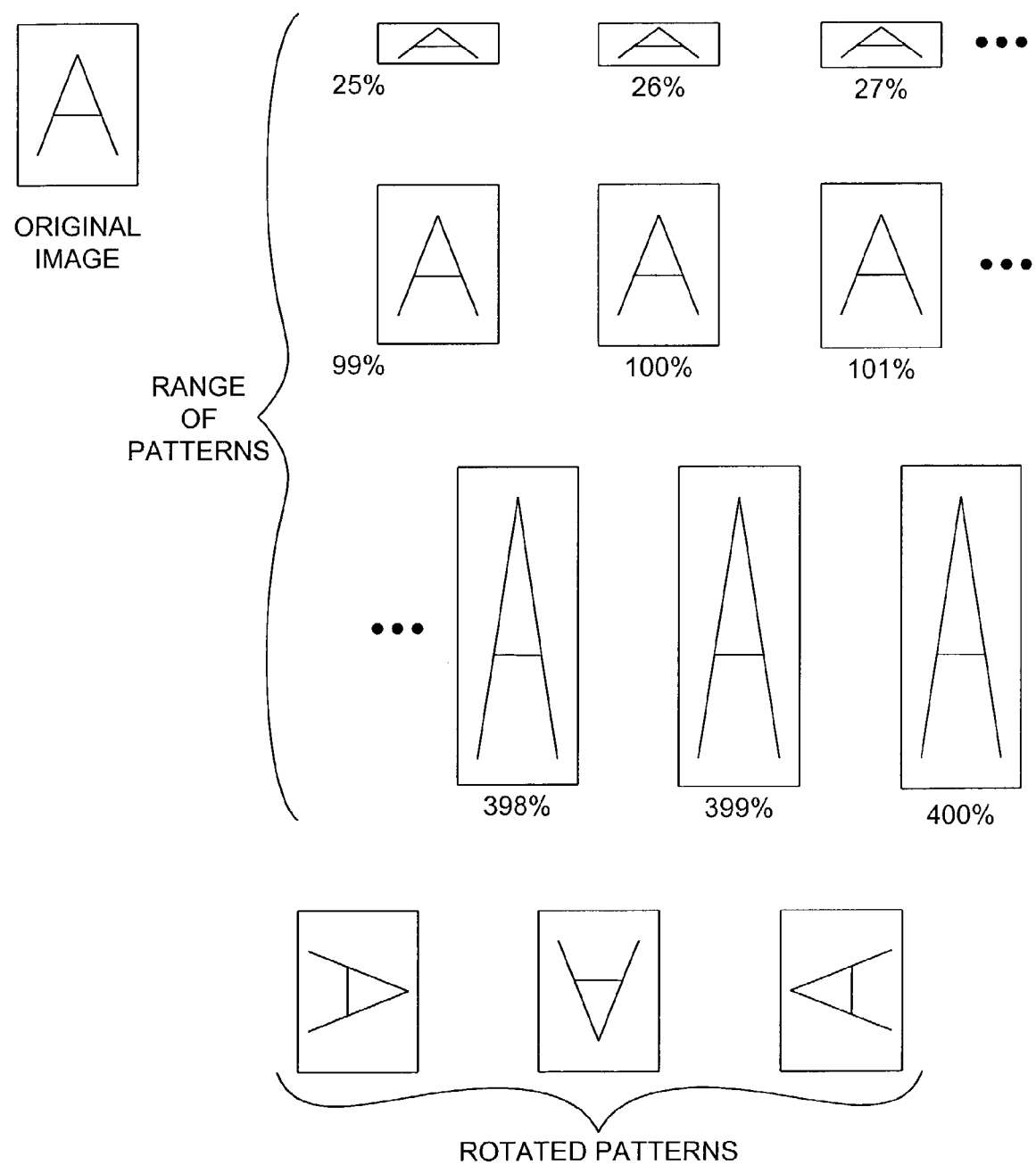
FIG. 3 is a graphical representation of patterns of an original image used by the judgment part of FIGS. 1A and 1B.

FIG. 3 is a graphical representation of patterns of an original image used by the judgment part of FIGS. 1A and 1B. As shown in FIG. 3, the original image can include a large number of corresponding protected patterns. In the grouping "RANGE OF PATTERNS," there is a protected pattern corresponding to each of a variety of zoom levels. In FIG. 3, the range of zoom levels is between 25% and 400%, with steps of 1%. It is possible to have different zoom levels and steps. Having the protected patterns with varying zoom levels enables a match of the scanned original image to be identified even when the scanner 12 provides a zoom adjustment of the scanned original image.

In addition to having protected patterns with varying zoom levels, it is also possible to have protected patterns with varying rotations. In this embodiment as shown in the grouping "ROTATED PATTERNS," the protected patterns show the original image rotated 90, 180 and 270 degrees. In addition to these rotated patterns, it is possible for the library to include other rotation amounts, as well as the varying zoom levels for each rotation amount.

The judgment part 16 compares the image data received from the selector 14 to determine if it matches any of the protected patterns in the library. If there is a match, a judgment is made that reproduction of the original image should be halted or prohibited. However, if no match is made, the reproduction of the original image can proceed. The actual processing for comparing the image data to the library of protected patterns is known in the art, such as Japanese Patent Publication No. 6-251128 to Tsutsumi et al., which is hereby incorporated in its entirety by reference.

The judgment of the judgment part 16 can also take into account the factors considered by the selector 14. For example, even if a match is found, the judgment result can indicate that reproduction is acceptable if the copy mode is a particular mode, such as black and white when the original image is a color image. The judgment from the judgment part 16 is then provided to the image processor 18 (step 210). The judgment part can provide the judgment signal regardless of the mode selection that is made.

As shown in FIG. 2, if the selector 14 and judgment part 16 are arranged according to the processing system 10 of FIG. 1B, the judgment part 16 judges whether or not to reproduce the original image based on at least the RGB data (step 212). As shown in FIG. 1B, the RGB data and the K data (the four lines) are all provided to the judgment part 16. It is also possible to have only the RGB data provided to the judgment part 16. The judgment part 16 generates the judgment of whether or not to reproduce the original image in the same manner as described above for step 208.

The judgment generated by the judgment part 16 is then selectively provided by the selector 14 to the image processor 18 (step 214). The selective provision of the judgment to the image processor 18 can be determined in the same manner as described above for step 206 with respect to providing image data to the judgment part 16. In particular, the selector 14 can take into account the copy mode and/or the color information of the original in determining whether or not to provide the judgment result to the image processor 18.

In accordance with the judgment result, whether or not a result is received from the judgment part 16, the image processor 18 performs image processing on the RGB and K data received from the scanner 12 (step 216). The image processor 18 can perform a number of image processing processes on the RGB data and K data including, for example, log conversion, color conversion halftone processing, dithering, error diffusion, gamma correction or other image processing step. If the judgment result indicates that the original image should not be reproduced, then the image processor 18 need not perform any image processing on the image data.

The input image data processed by the image processor 18 is then provided to the print processor 20, which reproduces the original image in accordance with the judgment result (step 218). The print processor 20 prepares the processed input image data for reproduction of the original image on a sheet. However, if the judgment result indicates that the original image should not be reproduced, then the print processor 20 does not prepare the processed image data for reproduction. As shown in FIGS. 1A and 1B, the judgment result can be provided to the image processor 18, the print processor 20 or both. If only provided to the print processor 20, then the image processor 18 can perform the image processing on the image data regardless of the judgment result.

In a related embodiment, the judgment 16 part can also have the option to receive image data from a memory that stores image data received from outside of the image forming apparatus. The judgment part can produce the judgment signal based on comparing either the image data from the CCD or the image data stored in the memory and the plurality of patterns in the storage part. The judgment part outputs the judgment signal regardless of the image data being image data from the CCD or the memory.

Figure 4:
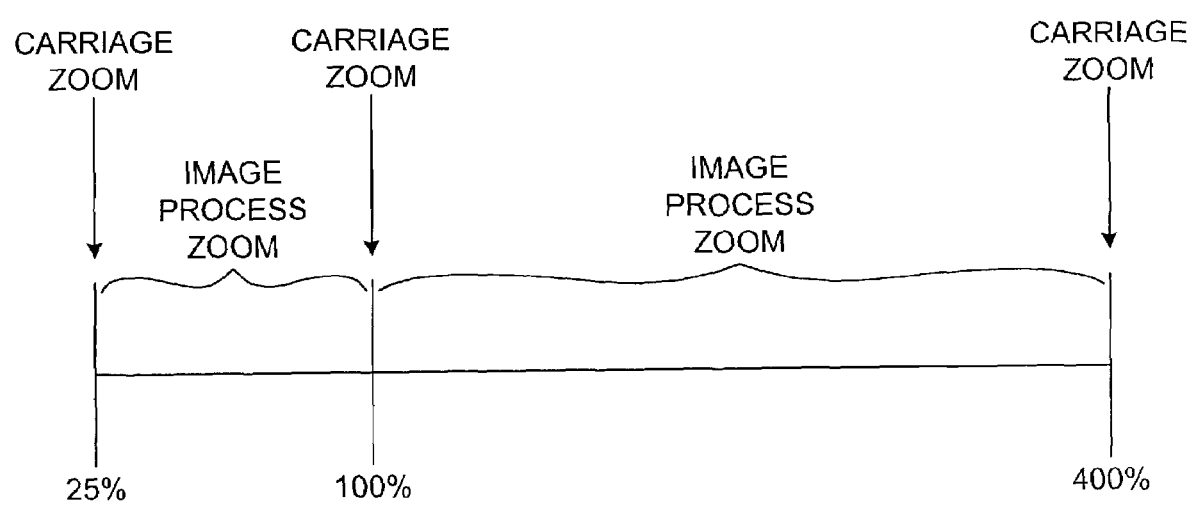
FIG. 4 is a graphical representation of a zoom system consistent with the present invention.

FIG. 4 is a graphical representation of a zoom system consistent with another aspect of the present invention. As described above, conventional zoom adjustment systems rely on adjusting the speed of the carriage scanner to adjust the zoom in the main scanning direction, which results in an expensive and complex motor control of the scanner. As shown in FIG. 4, the expense and complexity of the motor control can be reduced by using a combination of adjusting the speed of the carriage scanner and image processing. In particular, the motor control for the carriage scanner is reduced to a limited number of speeds corresponding to a limited number of zoom levels. As shown in FIG. 4, the limited number of zoom levels is three, corresponding to 25%, 100% and 400% for carriage-based zoom. It is possible for the limited number of zoom levels to be reduced or increased from the example shown in FIG. 4.

The incremental steps, such as 1% (although other steps are possible, such as 5%), can be implemented by using image processing. As shown in FIG. 4, the image processing zoom provides zoom adjustments for all zoom levels between 25 and 100% and between 100 and 400%. If the step is 1%, the ranges would be 26% to 99% and 101% to 399%.

When an arbitrary zoom level is selected by a user, a particular carriage zoom is chosen in accordance with the selected zoom level. Using the exemplary values of FIG. 4, if the selected zoom level is between 25 and 100%, then either the 25% or 100% carriage zoom is used. The particular level to be used can be selected, for example, by choosing the one closer to the selected zoom level, and then having the image processing zoom adjust the zoom level to achieve the user selected zoom level. Similarly, if the selected zoom level is between 100 and 400%, then either the 100% or 4000% carriage zoom is used, with the particular carriage zoom being selected in the same manner as described above. For example, if the user selected zoom is 32%, then a carriage zoom can be used to provide a zoom of 25%, and this zoom is adjusted to the user selected zoom level of 32% by virtue of the image processing zoom.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. An image forming apparatus, comprising:
 a four line charge-coupled device (CCD) which produces RGB data and K data that are read out selectably;
 a selector which selects whether to output the RGB data that is provided from the four line charge-coupled device (CCD);
 a storage part which stores a plurality of patterns; and
 a judgment part that produces a judgment signal based on a comparison of the RGB data and the plurality of patterns stored in the storage part.

* * * * *